Oct. 20, 1970  AKIRA ASARI  3,534,578
METAL TUBE EXTRUSION PRESS WITH A PLURALITY OF MANDRELS
Filed Sept. 11, 1967  3 Sheets-Sheet 2

AKIRA ASARI
*Inventor*

By Wenderoth Lind
and Ponack  *Attorneys*

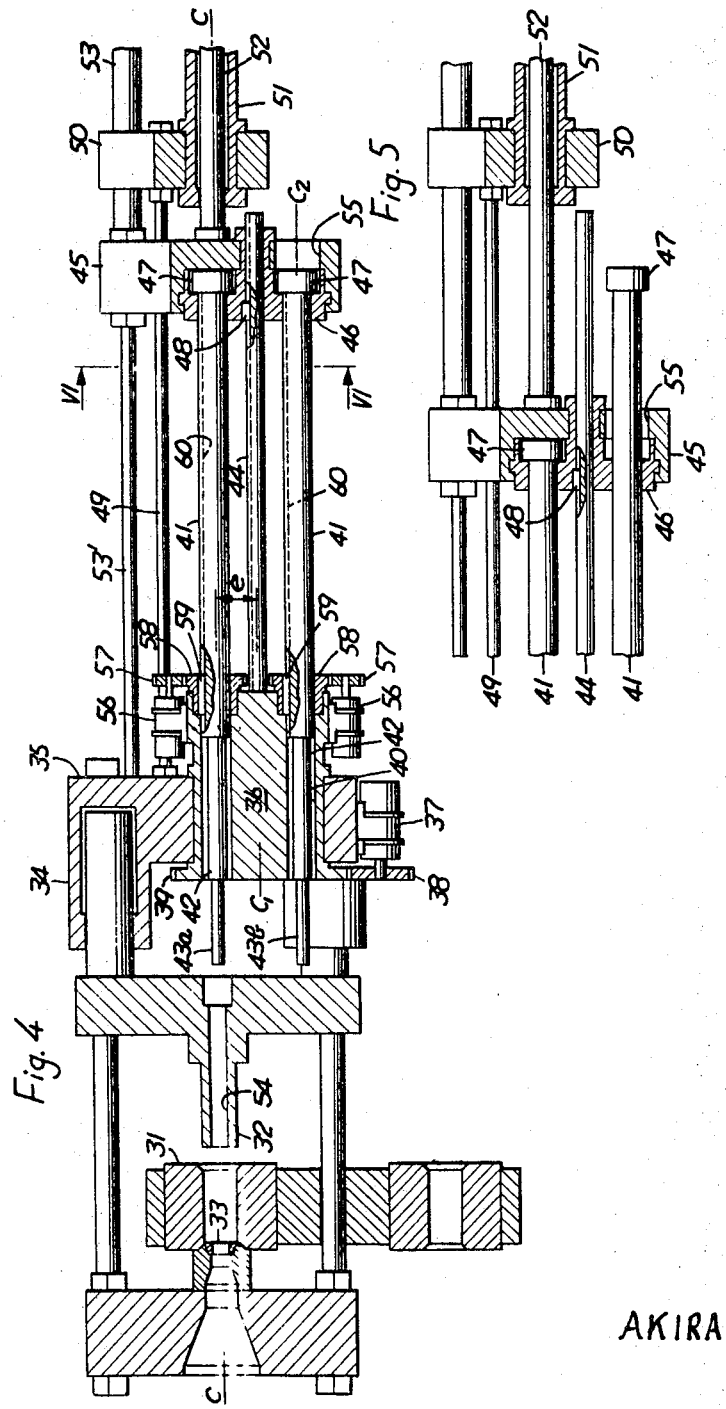

United States Patent Office 3,534,578
Patented Oct. 20, 1970

3,534,578
METAL TUBE EXTRUSION PRESS WITH A PLURALITY OF MANDRELS
Akira Asari, Osaka, Japan, assignor to Kobe Steel Ltd., Wakihama-cho, Fukiai-ku, Kobe, Japan
Filed Sept. 11, 1967, Ser. No. 666,587
Claims priority, application Japan, Sept. 24, 1966, 41/63,133
Int. Cl. B21c 25/04
U.S. Cl. 72—263                3 Claims

ABSTRACT OF THE DISCLOSURE

A multi-mandrel arrangement comprising two or more mandrels disposed side-by-side in the extruding direction, said mandrels being held by a mandrel-holding member, said mandrel-holding member being operatively connected to a driving mechanism so that the mandrels may be moved in turns to the extruding centerline one at a time, and a driving mechanism operatively connected thereto for advancing and retracting at least one mandrel positioned on the extruding centerline in the extruding direction.

---

This invention relates to a multi-mandrel arrangement for metal tube extruding press.

In producing metal tubes of hollow billets, in order to increase the rate of operation by reducing a press cycle, i.e., the length of time required for extrusion of a metal tube, it is necessary to solve a number of problems. One of these problems is to rationalize the auxiliary operations necessary for extrusion and another is to rationalize cooling of mandrels.

One conventionally suggested approach to rationalization of the auxiliary operations is to provide a press having a plurality of containers. Thus, a plurality of containers adapted to be successively moved to the extruding position are provided to a single press wherein the auxiliary operations such as charging of a billet, removal of extrusion residue and cooling of the containers are effected at a position different from that for extrusion and simultaneously with the extruding operation, whereby the cycle is greatly reduced as compared with a press having a single container, with the result that the yield is greatly increased. Therefore, such apparatus suddenly became the object of the attention in the industry as a machine for producing extruded articles.

However, in case of extrusion of metal tubes, rationalization of only the auxiliary operations by provision of a plurality of containers does not lead to a solution to be problem, i.e., rationalization of cooling of mandrels. That is, the aforementioned mandrel is inserted in a heated hollow billet with the entire peripheral surface of the mandrel in pressure contact with the inner surface of the hollow billet and the mandrel is considerably heated each time one extrusion is operated. As a result, it is necessary to fully cool the mandrel after each extrusion, which cooling requires a considerably long period of time. Further, the temperature to which the mandrel is heated varies with the shape of the mandrel and therefore the cooling time also varies. If cooling of the mandrel is not in a sufficient degree, the life of the mandrel will be very much shortened, since there is a certain limit to the heat-resistant strength thereof. Moreover, the mandrel is provided with an exteremly smooth finished surface for minimizing the frictional resistance caused by the slide movement between its surface and the inner surface of the hollow billet. Therefore, the mandrel surface must be cleaned after each extrusion. This cleaning takes much troubles. Therefore, lack of reasonable length of time therefor is undesirable.

Thus, it is seen that rationalization of cooling of mandrels is a requirement not only to the ordinary type of press having a single press, but also to a press of the type having a plurality of containers. That is, as mentioned above, even in case of a conventional extrusion press having a plurality of containers, the mandrel is inserted in a billet, is highly presurized and is heated at each extruding operation, so that it is necessary to cool it after each extruding operation. After all, it follows that the time required for extruding operation becomes protracted even if the aforementioned auxiliary operations can be effected in a given period of time, thus making it impossible to increase the number of press cycles in a fixed time and to make full use of the merits of the multi-container type extrusion press.

This invention relates to a mandrel arrangement for a press for extruding tubular products from billets and more particularly it relates to an arrangement using two or more mandrels whereby such mandrels are moved in turns to the extrusion centerline, one at a time, and are driven.

The objects of the invention are to provide a mandrel arrangement adapted to allow mandrels to be fully cooled; to provide a mandrel exchanging arrangement whereby after one mandrel has been used for one tube extrusion the said one mandrel can be dispensed with for the next tube extrusion so that it can afford to remain idle until it is fully cooled; to provide a mandrel arrangement which extremely facilitates exchange of mandrels; to provide a mandrel exchanging arrangement which allows easy application of cooling means, cleaning means and lubricant applying means to each of the mandrels after it has beeen used for one tube extrusion; and, finally, to provide a single-container type or multi-container type tube extruding press whose efficiency of operation is highly increased.

This invention is characterized in that it has two or more mandrels so arranged that they may come one-by-one into the extruding centerline and that they may be moved between said centerline and a station offset from said centerline.

These mandrels are held by means of a frame to which are secured cylinders for producing hydraulic pressures to drive a stem for extrusion. The mandrels held by the frame are disposed in parallel in the extruding direction and while one mandrel occupies the extruding centerline, the other mandrel or mandrels are waiting in positions offset for the extruding centerline so that they may be transferred one-by-one to said centerline. In order to transfer the mandrels one-by-one the extruding centerline, use may be made of an exchanging device adapted to revolve or slide a mandrel holding member. In order that one mandrel which has been transferred to the extruding centerline may be advanced during the extruding step or retracted after completion of extrusion, there may be employed a hydraulic device which is often used in this kind of presses, or alternatively a mechanical drive such as screw mechanism may be employed. This driving device may be attached to each of the mandrels, or alternatively a single drive common to all the mandrels may be affixed to a mandrel holding member. Needless to say each mandrel is cooled by usual means. In the arrangement may be such that the individual mandrels are each revolved around the respective axes. In order to retract each mandrel after extrusion, it is possible to additionally provide a simple pulling-out attachment.

While the mandrel arrangement of this invention is suitable for extrusion of tubes by using hollow billets, it may, of course, also be applied to an extrusion press for producing extruded articles wherein a solid billet is charged directly into the extrusion press, followed by forced insertion of a mandrel into the solid billet to pierce it to provide an opening therein, and in this condition, i.e. with said billet held within the container and with the front end of the mandrel held within the die, the front end is pressed against the end face of the billet.

By embodying this invention, a plurality of mandrels are successively used for extrusion, so that while one mandrel is performing extrusion the other mandrels are subjected to sufficient cooling and cleaning, whereby the extrustion cycle can be markedly improved and the efficiency of operation can be greatly increased as compared with a press of the type having only one mandrel.

The invention will be explained in more detail by referring to the accompanying drawings wherein:

FIG. 4 is a cross-sectional plan view showing another example of a press;

FIG. 5 is a cross-sectional plan view showing part of the press shown in FIG. 4, but in a different operative position.

Figure 1:
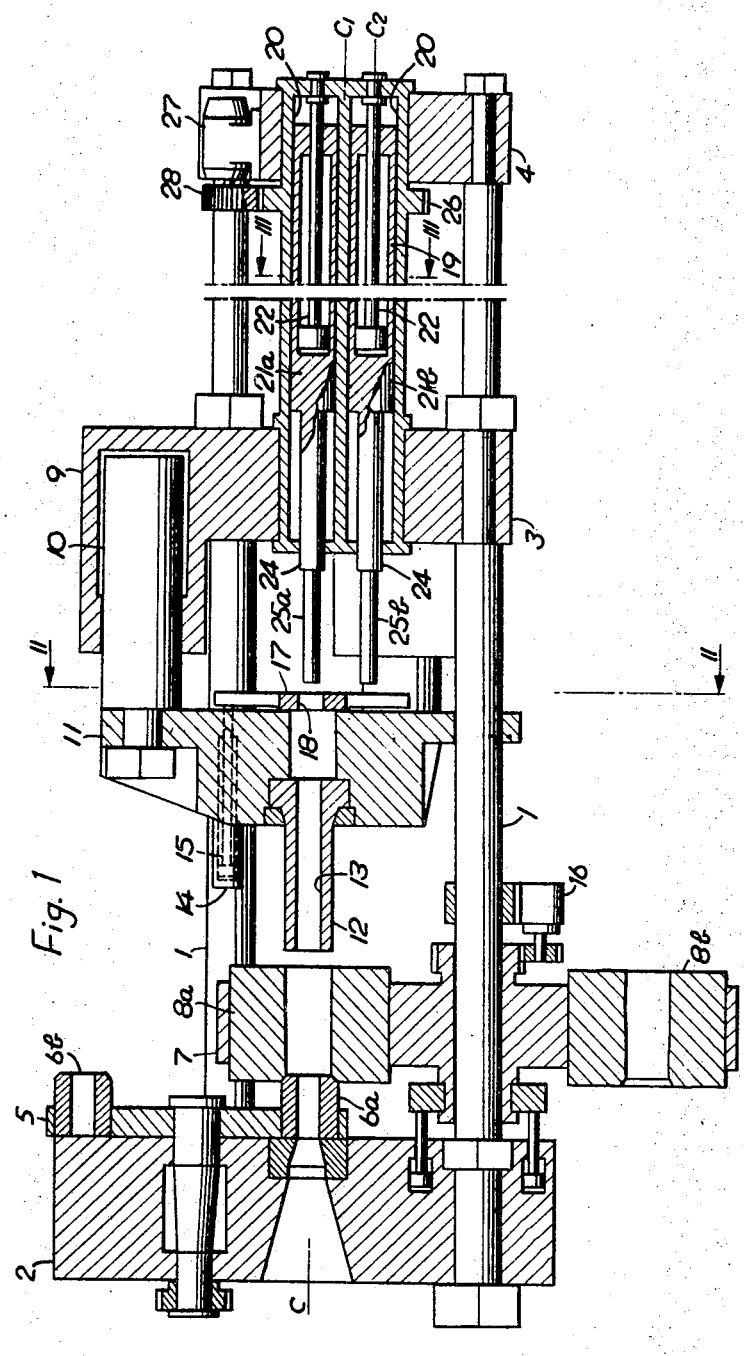
FIG. 1 is a cross-sectional plan view showing an example of a press incorporating therein a multi-mandrel arrangement according to this invention.
Figure 2:
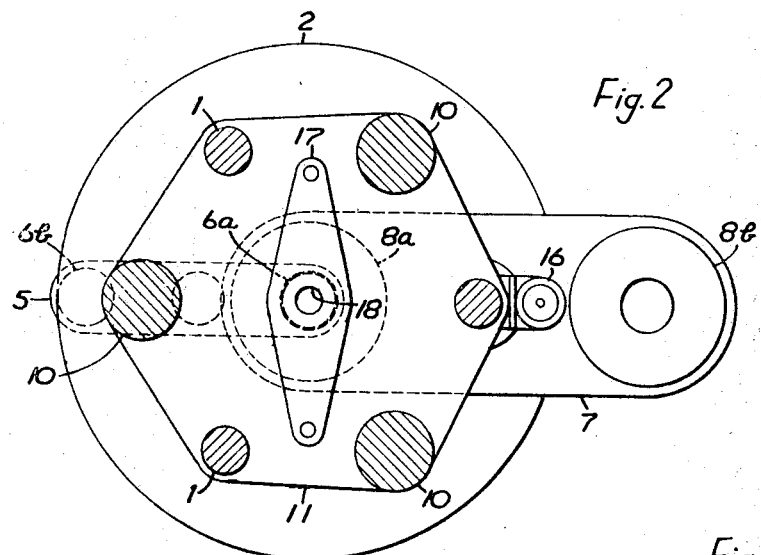
FIGS. 2 and 3 are sectional views taken along the lines II—II and III—III of FIG. 1, respectively.
Figure 3:
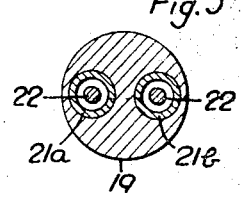

In FIGS. 1–3, there is shown by way of example a tube extruding press having two mandrels, each having its own driving device.

Support bars 1 have a frame 2 attached to the front ends thereof, a cylinder frame 3 attached to the middle portions thereof and a support block 4 attached to the rear ends thereof, all these members thus constituting a support assembly.

Disposed on the front of the frame 2 is a die holder 5 to which dies 6a and 6b are removably attached. Further, containers 8a and 8b held by a revolvable container holder 7 are disposed in front of said holder 5.

The cylinder frame is integrally provided with three main cylinders 9, each having a main ram 10 slidably fitted therein and integral with a cross-head 11. The cross-head 11 is guided along the support bars 1 and movable accurately in the extruding direction. A stem 12 is attached to the front middle portion of the cross-head 11 in such manner that the axis of said stem is in alignment with the extruding centerline C, so that when the cross-head 11 is advanced the stem 12 will enter the container 8a which is now positioned on the extruding centerline.

The stem 12 is provided with an opening 13, the axis thereof being aligned with the extruding centerline.

The cross-head 11 may, if necessary, be provided with an auxiliary cylinder 14 for pulling out the mandrels, said cylinder 14 having a piston 15 fitted therein, and a pulling-out member 17 is fixed to the piston end and has an opening 18 formed therein corresponding to the opening 13 in the stem 12.

A revolvable cylindrical body 19 of circular cross-section is revolvably attached to the support block 4 and cylinder frame 3 in such a manner that the axis $C_1$ of said body is offset by $e$ from the extruding centerline. The revolvable body 19 is provided with two guide holes 20 mutually symmetrically disposed with respect to the axis of said body 19 so that either one of the guide holes 20 may be in alignment with the extruding centerline, even if the body 19 is revolved. Mandrel cylinders 21a and 21b slidably fitted in the respective guide holes 20 so as to be movable in the extruding direction.

Fitted in said mandrel cylinders are mandrel pistons 22a and 22b, and the outer ends of their mandrel piston rods extend through the mandrel cylinders and are attached to the end wall of said revolvable cylindrical body 19. Attached to the front end of each mandrel cylinder 21a, 21b is a mandrel holder 24a, 24b whose diameter is the same as or slightly smaller than that of the mandrel cylinders. Further, mandrels 25a and 25b of smaller diameter than the mandrel holders are attached to the front ends of the mandrel holders.

The outer periphery of said revolvable cylindrical body 19 is formed with a gear wheel 26 meshing with a pinion 28 on a motor fixed mounted on the support block 4.

In operation, at first, a hollow billet is charged in a container which is positioned off the extruding centerline C. Then, a motor 16 is started to revolve the container holder 7 through 180° around the axis of the associated support bar 1 to bring the container 8a which has now received said hollow billet into correct alignment with the extruding centerline C. Then, the front chamber of the mandrel cylinder 21a which is now on the extruding centerline C is pressurized to advance the mandrel 25a. At this time, the mandrel holder 24a is passed through the aforementioned openings 18 and 13 until its front end enters the die 6a with a predetermined clearance maintained therebetween.

Then, the main cylinders 9 are pressurized to advance the cross-head 11 so as to press the hollow billet by the stem 12, thereby extruding a hollow tubular product through the clearance between the die 6a and mandrel 25a.

Since the mandrel 25a is in close contact with the inner surface of the tube stock during extrusion, a force strong enough to overcome the friction is required in order to pull out the mandrel 25a after completion of extrusion. If the hydraulic force applied to the mandrel cylinder 21a is not sufficient to pull out the mandrel, use is also made of the aforementioned pulling-out attachment 17 positioned adjacent the cross-head 11. Thus, in order to pull out the mandrel 25a after completion of extrusion, the pulling-out cylinder 14 is pressurized allowing the stem 12 to remain in the condition as it is, thereby to advance the pulling-out member 17 to push the end face of the mandrel cylinder 21a until the mandrel is pulled out away from the extrusion residue. Of course, the mandrel cylinder 21a is concurrently pressurized so that pulling-out is effected by the sum of the two forces. Thereafter, the mandrel 25a is returned to its original position by the single force applied to the mandrel cylinder 21a. Concurrently with the aforementioned operations, the motor 27 to return the pulling-out member 17 to its original position. After completion of extrusion, the tubular product is severed from the extrusion residue by a suitable device (not shown) and is then forwardly pulled out. Concurrently with the aforementioned operations, the motor 27 is started to revolve the cylindrical body 19 to bring a fully cleaned and cooled mandrel 25b to the extrusion centerline C and also to move the previously employed mandrel 25a to a separate position $C_2$, where cleaning and cooling operations are performed. At the same time, the die 6a and the mandrel 25a are respectively replaced by new ones. The aforementioned operations are repeated to produce extruded articles.

Figure 6:
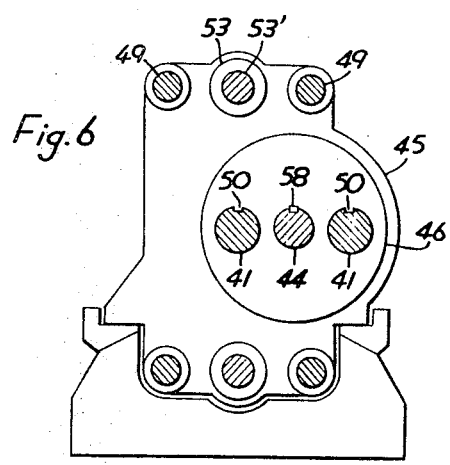
FIG. 6 is a sectional view taken along the line VI—VI of FIG. 4.

FIGS. 4–6 illustrate a multi-mandrel arrangement having a single driving mechanism adapted to advance and retract two mandrels. In this embodiment, the invention is applied to a tube extruding press having a plurality of containers 31, wherein when a billet within a container positioned on the extruding centerline C is forwardly extruded through a die 33 by a stem 32, a mandrel to be presently described will be inserted therein for extrusion of a tube.

A mandrel-revolving body 36 revolvable around a centerline $C_1$ offset by $e$ from and parallel to the extruding centerline C is mounted in a frame 35 for a main cylinder 34 which drives the stem 32. This mandrel-revolving body 36 is revolved, for example, by driving a revolving gear wheel 39 by a gear wheel 38 driven by a motor 37. The mandrel-revolving body 36 is provided with as many equispaced mandrel holes 40 as the two or more mandrels bored therein and parallel to the centerline $C_1$. The mandrels 43a and 43b and mandrel holders 42 attached to the front ends of mandrel bars 41 are passed respectively through the holes 40.

A revolving support shaft 44 extends rearwardly and centrally of the mandrel-revolving body 36 and has its free end supported by a separately provided mandrel cross-head 45 through a saucer-like lid disk 46. The distal end of each of said mandrel bars 41 passes through the lid disk 46 and heads 47 are secured outwardly thereof. The mandrel-revolving body 44 and lid disk 46 are keyed together so that they may revolve as a unitary body. The mandrel cross-head 45 is adapted to be advanced and retracted in the extruding direction along a support bar 49 spanned between the cylinder frame 35 and a mandrel cylinder frame 50 to be later described. More particularly, it is a driven for forward movement by being connected to a mandrel ram 52 in a cylinder 51 mounted in a cylinder frame 50, and is retracted by a separate cylinder 53.

In the aforementioned arrangement, when the mandrel cross-head 45 is advanced in the extruding direction by the mandrel ram 52, the mandrel bar of the mandrel is advanced on the extruding centerline due to the forward movement of said cross-head 45 with the mandrel hole 40 in the mandrel-revolving body 36 serving as a guide therefor, and the mandrel 43a and mandrel holder 42 enter the hole 54 in the stem 32, thereby initiating the extrusion of the billet in the container 31 into a tubular article. In this case, if the mandrel 43a positioned on the extruding centerline C is to be advanced and it is not desired to advance the other mandrel 43b on the outer station $C_2$, this may be achieved by the provision of a hole 55 in the cross-head 45 at a position on the station $C_2$ and having a larger diameter than that of the heads 47 of the mandrel bars 41, so that when the mandrel cross-head 45 is advanced, the mandrel bar 41 on the outer station remains in its position while the cross-head 45 alone is advancing (FIG. 5).

When the mandrel cross-head 45 is retracted by the cylinder 53 when the stem 32 is retaracted after completion of one tube extrusion, the lid disk 46 is also retracted integrally therewith, so that the mandrel 43a on the extruding centerline is retracted together with the mandrel bar 41 with the head 47 engaged with said lid disk. After this retracting operation, when the motor 37 is driven to revolve the mandrel-revolving body 36 around the centerline $C_1$, all the mandrels 43a and 43b, including the lid disk 46, are revolving moved, so that the mandrel 43b which was positioned on the outer station $C_2$ and has already been cooled and cleaned is moved to the extruding centerline $C_1$, which the hot mandrel 43a used in the now completed extrusion is moved to the outer station $C_2$, where it is then cooled, cleaned or lubricated.

In this manner, exchange of mandrels alone is effected for each tube extrusion and an already cooled mandrel is moved in the extruding direction by single drive means.

When it is desired to revolve the mandrels around their own axes in order to achieve uniform cooling or to facilitate application of lubricant, a revolving sleeve 58 rotated by a motor 56 through a gear wheel 57 may be provided for each mandrel 43a, 43b and is mounted on the end face of the mandrel-revolving body 36 in such a manner that the associated mandrel bar 41 may be fitted in the revolving sleeve through a key 59. In this case, when the mandrel bars 41 are advanced or retracted, the keys 59 slide along key ways 60.

What I claim is:

1. A multi-mandrel arrangement for a metal tube extrusion press, comprising two or more mandrels, means adapted to support said mandrels side-by-side in the direction of extrusion with one of said mandrels positioned on the extrusion centerline, a driving mechanism operatively connected to the mandrel-supporting means for driving said mandrel-supporting means so that said mandrels may be moved in turn to said extrusion centerline, and means operatively connected to at least said mandrel positioned on said extrusion center line for advancing and retracting the said mandrel in the direction of extrusion, said last mentioned means being affixed to said mandrel-supporting means.

2. An arrangement as claimed in claim 1, wherein said mandrel-supporting means including a cross-head and said means for advancing and retracting at least said mandrel positioned on said extrusion center line operate to move said cross-head, whereby the said mandrel follows the movement of said cross-head but the outer mandrels do not follow the same.

3. A multi-mandrel arrangement for a metal tube extrusion press, comprising two or more mandrels, means adapted to support said mandrels side-by-side in the direction of extrusion with one of said mandrels positioned on the extrusion centerline, a driving mechanism operatively connected to the mandrel-supporting means for driving said mandrel-supporting means so that said mandrels may be moved in turn to said extrusion centerline, and means operatively connected to at least said mandrel position on said extrusion centerline for advancing and retracing the said mandrel in the direction of extrusion, said last mentioned means including a cylinder and piston affixed to each mandrel.

References Cited

UNITED STATES PATENTS

| 1,712,259 | 5/1929 | Davis | 72—263 |
| 2,672,234 | 3/1954 | Lorant | 72—265 |
| 3,377,832 | 4/1968 | Singleton | 72—263 |

LOWELL A. LARSON, Primary Examiner

U.S. Cl. X.R.

72—265